Figure 1:
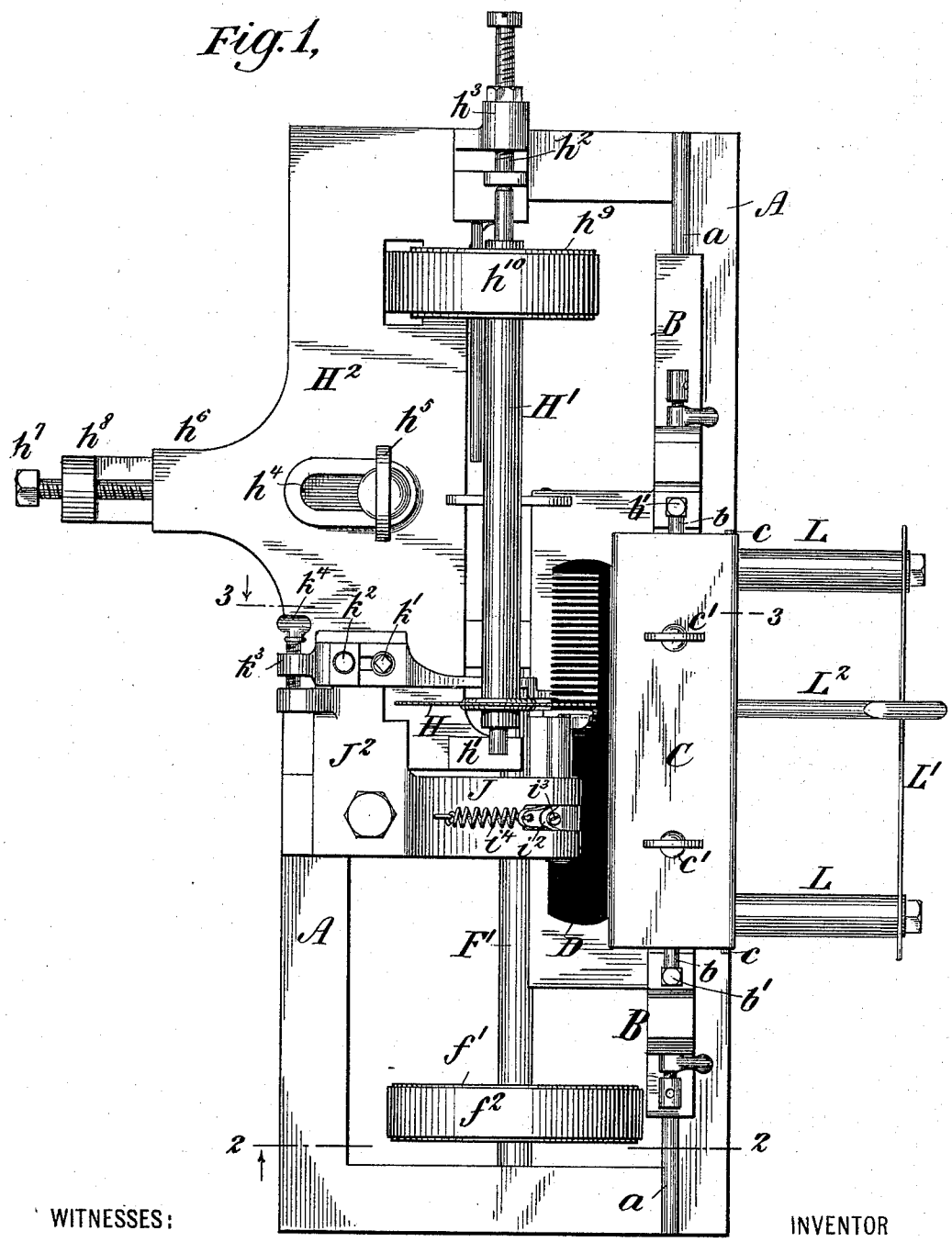

(No Model.)  3 Sheets—Sheet 1.

F. W. GRELL.
MACHINE FOR MANUFACTURING COMBS.

No. 585,818.  Patented July 6, 1897.

WITNESSES:  INVENTOR
Frederick William Grell
BY Edwin H. Brown
HIS ATTORNEY (No Model.)  3 Sheets—Sheet 2.
F. W. GRELL.
MACHINE FOR MANUFACTURING COMBS.
No. 585,818. Patented July 6, 1897.
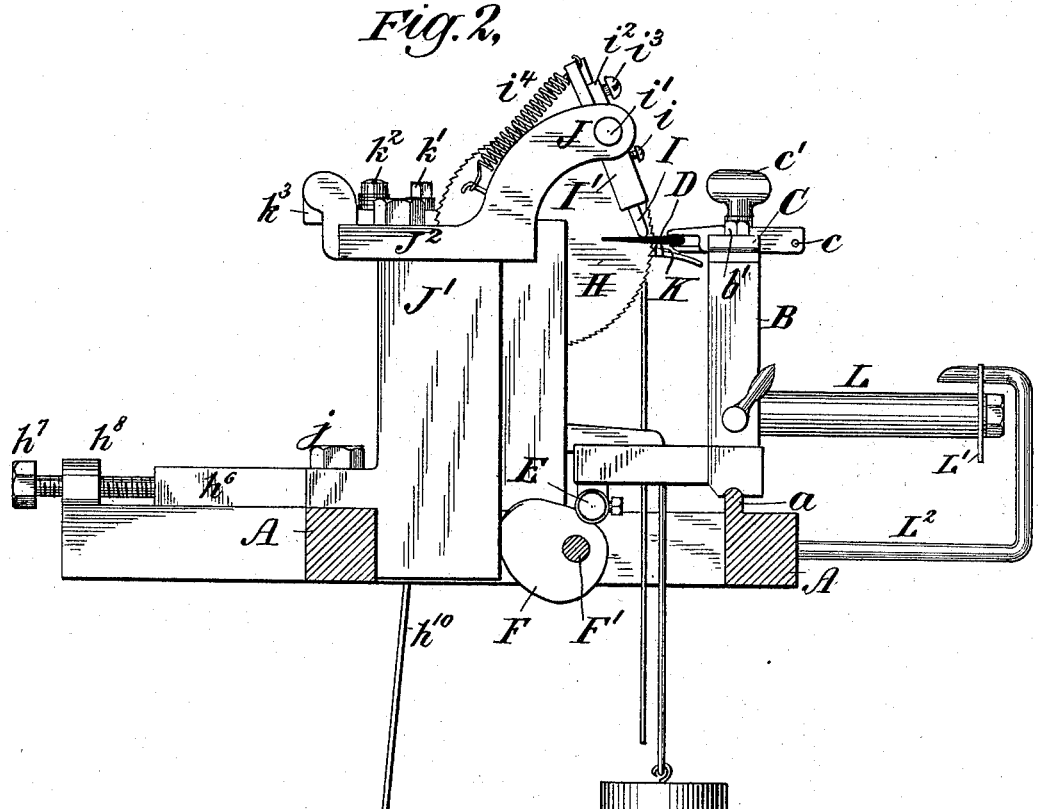
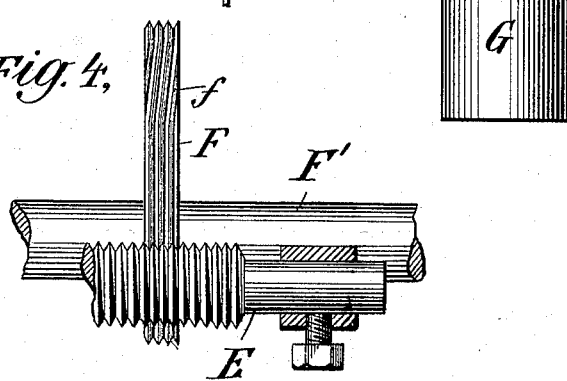
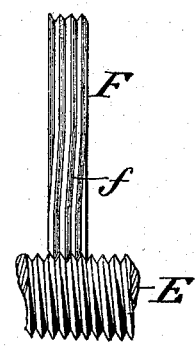
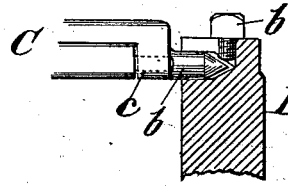
WITNESSES:
D. N. Raynord
Ernest Hopkinson
INVENTOR
Frederick William Grell
BY Edwin N. Brown
HIS ATTORNEY (No Model.) 3 Sheets—Sheet 3.
F. W. GRELL.
MACHINE FOR MANUFACTURING COMBS.
No. 585,818. Patented July 6, 1897.
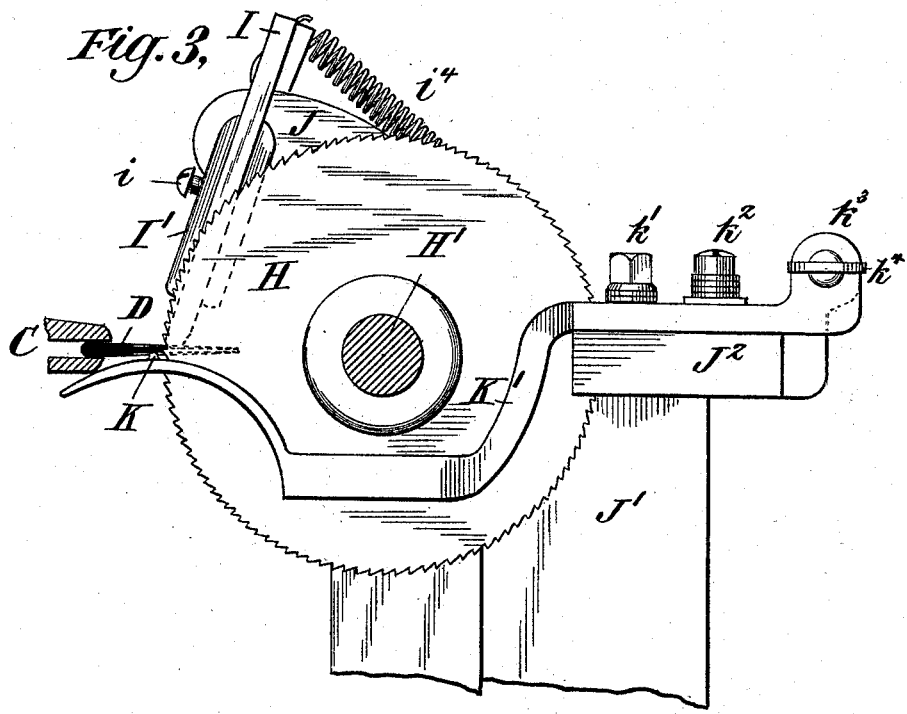
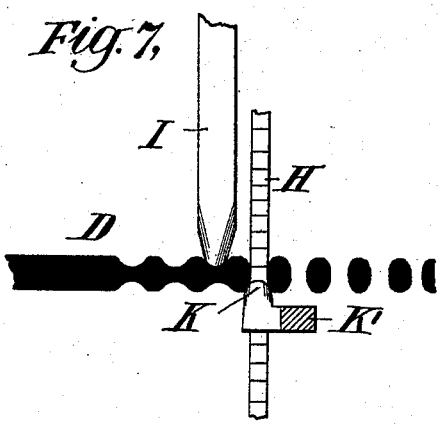
WITNESSES: INVENTOR
Frederick William Grell
BY Edwin H. Brown
HIS ATTORNEY

UNITED STATES PATENT OFFICE.

FREDERICK WILLIAM GRELL, OF COLLEGE POINT, NEW YORK, ASSIGNOR TO THE INDIA RUBBER COMB COMPANY, OF SAME PLACE.

MACHINE FOR MANUFACTURING COMBS.

SPECIFICATION forming part of Letters Patent No. 585,818, dated July 6, 1897.

Application filed October 27, 1896. Serial No. 610,204. (No model.)

*To all whom it may concern:*

Be it known that I, FREDERICK WILLIAM GRELL, of College Point, in the county of Queens and State of New York, have invented a certain new and useful Improvement in Machines for the Manufacture of Combs, of which the following is a specification.

In the manufacture of dressing-combs, by which I mean combs used by persons for dressing their hair, it has been common to produce coarse teeth by sawing them out of solid plates. Hard rubber and analogous materials shrinking variably it has been impossible to mold teeth into the material and then saw them automatically without liability of producing imperfect teeth. It is desirable to mold the teeth in order that they may be rounded, and also for economy of material.

The object of my improvement is to provide for molding teeth and afterward for accurately sawing the films or webs between the molded teeth without danger of damaging the teeth themselves, and to accomplish this automatically.

I will describe a machine embodying my improvement and then point out the novel features in the claims.

In the accompanying drawings, Figure 1 is a plan of a machine embodying my improvement. Fig. 2 is a vertical section of the same, taken as indicated by the line 2 2 in Fig. 1. Fig. 3 is an enlarged vertical section taken at the plane of the dotted line 3 3 in Fig. 1. Fig. 4 is a detailed view, on an enlarged scale, taken in a vertical plane extending lengthwise of the machine. Fig. 5 is an enlarged sectional view in a vertical plane. Fig. 6 is a top view of parts illustrated in Fig. 4, showing the manner in which such parts engage. Fig. 7 is a sectional elevation taken lengthwise of the machine and illustrating on a large scale a comb-blank, a saw or cutter operating thereon, and guides for maintaining a proper relation between the comb-blank and the saw or cutter.

Similar letters of reference designate corresponding parts in all the figures.

A designates the base of the machine. It may be of any suitable form and material.

B designates a carriage or support fitted to slide upon a track $a$, formed lengthwise of the frame A. It will be seen that the top of the track is rounded, and that the seat of the carriage is correspondingly formed, so that the carriage may oscillate transversely to the length of the machine. In the upper part of this carriage is a clamp or holder C, adapted to receive and hold a comb-blank D. This clamp C may be of any suitable form. In the present instance it is composed of two parts hinged together at $c$ and maintained in proper relation to each other for the purpose of holding a comb-blank by means of screws $c'$. Between the clamp C and the carriage B is a pivotal connection, which is here shown as made by fastening pins $b$ in recesses or bearings formed in the top of the carriage and holding said pins down in said recesses or bearings by screws $b'$. As shown in Fig. 5, these pins have conical ends and fit in suitable recesses or holes in the ends of the body or main part of the clamp. It is not intended that the ends of both the pins $b$ shall be in contact with the ends of these recesses or holes, because it is intended to provide for some lengthwise play of the clamp to enable a comb-blank held therein to be suitably adjusted relatively to the cutter or saw which is to operate upon it. Of course I wish to cover any equivalent arrangement whereby this play can be obtained.

Journaled in bearings on the under side of the carriage B is a screw E. This engages with a threaded cam F, that is affixed to a shaft F', journaled in the frame A. This shaft may be rotated in any approved manner—as, for instance, by means of a pulley $f'$, rigidly affixed to it, and a belt $f^2$, applied to said pulley.

It will be seen by reference to Fig. 2 that this cam F is ellipsoidal. Its thread is parallel with its sides throughout almost its entire periphery, but at one point $f$ it inclines abruptly to one side. Owing to the peripheral contour of this cam it serves to oscillate the carriage B in one direction and to permit of its oscillation in the reverse direction under the influence of a weight G, attached to said carriage. The inclined portion $f$ of the thread of the cam serves to move the carriage B lengthwise of the track $a$ with which the frame A is provided. Therefore each time the cam rotates it will produce an oscillation of the carriage B backward and forward and also move it lengthwise of the rail $a$ for a short distance, this distance being in the present instance equal to the width of the thread of the cam.

H designates a cutter, here shown as made in the form of a rotary saw. The shaft or arbor H' upon which it is mounted is journaled in bearings $h'$ $h^2$. As here shown, the bearing $h'$ is an open-top bearing and the journal fitting within it is cylindrical, but the other journal is conical, and the bearing $h^2$ has a hole suitable for receiving it and is made in the form of a screw which engages with a tapped hole in a bracket $h^3$. The bearing $h'$ and the bracket $h^3$ are appurtenances of a plate $H^2$, which is supported by the frame A, but is adjustably connected therewith, so as to provide for shifting the saw into different positions. As here shown, this plate is provided with a slot $h^4$, extending transversely to the length of the frame A, and is combined with a screw $h^5$, that passes through its slot and engages with a tapped hole in the frame A. I have shown the plate $H^2$ as provided with a shank or offset $h^6$ for coacting with a set-screw $h^7$, which is engaged with a tapped hole formed in a lug $h^8$, extending upwardly from the frame A.

Any suitable means may be provided for rotating the saw. I have here shown a pulley $h^9$, affixed to the saw-arbor and receiving motion from a belt $h^{10}$.

I designates a guide for engaging with the upper surface of the grooves that are pressed in the comb-blank for the coarse teeth. It is made in the form of a finger and fitted in a slideway I', which is formed integral with a rock-shaft $i'$. The finger may be adjusted lengthwise of the slideway and secured in any desired position by a set-screw $i$. The rock-shaft $i'$ is supported in bearings in a bracket J. This bracket is shown as mounted upon an upright piece J', that is affixed by a screw $j$ to the frame A. That part of the bracket J which receives the rock-shaft $i'$ is bifurcated and in its bifurcate portion fits a clamp $i^2$, which is composed of two parts embracing the rock-shaft and capable of being clamped together by a set-screw $i^3$. By loosening this clamp the rock-shaft $i'$ may be moved longitudinally, so as to adjust the guide I toward or from the saw. It will be seen that the upper end of the clamp $i^2$ is connected by a spring $i^4$ to the bracket J. This spring will resist any tendency of the guide I to move too far inward toward the lower part of the bracket.

K designates another guide. It is intended to engage with the under side of one of the grooves molded into the comb-blank for the coarse teeth. As will best be seen by reference to Fig. 2, this guide consists of a small finger arranged just in advance of the saw and extending upwardly from an arm K', which is fastened by screws $k'$ $k^2$ to a plate $J^2$, extending from the bracket J. The arm K' is longitudinally slotted above the said plate, and through this slot pass the screws $k'$ $k^2$. The screw $k'$ is of a size to fit snugly within the slot of the arm K', so that the latter may swing upon it as a center or pivot. The screw $k^2$ is, however, much smaller in diameter than the width of said slot in order that the arm K may be permitted to swing upon the screw $k'$ as a pivot. Both of these screws are shouldered, so that they may be tightened to clamp the arm K' into position. To facilitate a nice adjustment, the arm K' is provided with an upturned lug $k^3$, having formed in it a tapped hole, through which a screw $k^4$ works. The end of this screw abuts against a lug upon the plate $J^2$.

It will be remembered that the carriage B oscillates or rocks as well as moves lengthwise of the frame A. As the clamp C is pivotally connected with the carriage and engaged with the guides I K, it is reciprocated in a horizontal plane by the oscillating or rocking movement of the carriage. The oscillations of the carriage B are, as already explained, produced by the threaded cam F. In addition to this cam I provide means which will prevent the carriage from always following the cam, this being used to provide for varying the length of the teeth, as is customary at the end of a series, in the manner illustrated in Fig. 1.

From the carriage B extend forwardly two rods L, which at their outer extremities have fastened to them a pattern-plate L', whose purpose is to determine the length which the comb-teeth shall have. The top edge of this pattern-plate will therefore be shaped correspondingly with the general line described at the bases of the teeth. From the frame A extends forwardly a rod $L^2$, which at its forward end is bent upward and thence rearward over the top edge of the pattern-plate L'. This rod by coacting with the pattern-plate will prevent the carriage, and hence the clamp C and comb-blank, from moving as far rearward as they might otherwise do if permitted to follow the cam at all times.

It must be understood that the reciprocations of the comb-blank are such as to carry it entirely beyond the guides after each operation of the cutter or saw, and that when free from the cutter and the guides the comb-blank is moved longitudinally, so as to bring the next webs between two teeth opposite the guides and cutter.

In Fig. 6 I have shown that a slight play may be provided between the teeth of the screw E and those of the threaded cam F. This expedient may be used instead of the play heretofore described as existing between the clamp C and the carriage B.

It will be seen that an important feature of my improvement consists in providing for some freedom of movement between a comb-blank and a cutter or saw in the direction of the length of the comb and engaging the cutter or saw and comb-blank by means of guides, so that even if the molded teeth be spaced somewhat variably the proper relation between the cutter or saw and the spaces between the molded teeth will always be maintained.

What I claim as my invention, and desire to secure by Letters Patent, is—

1. In a comb-cutting machine, the combination of a cutter, a support for a comb-blank, means for reciprocating the support toward and away from the cutter, devices for intermittently feeding the comb-blank and its support longitudinally, and means independent of said feeding devices acting through the comb-blank for causing a relative movement between the comb-blank support and the cutter in the direction of the length of the blank, substantially as described.

2. In a comb-cutting machine, the combination of a cutter, a support, a holder for a comb-blank carried upon the support and capable of longitudinal movement thereon, means for reciprocating the support and its holder toward and away from the cutter, devices for intermittently feeding the support and comb-blank holder longitudinally, and means independent of said feeding devices acting through the comb-blank for causing the longitudinal movement of the comb-blank holder upon its support, substantially as described.

3. In a comb-cutting machine, the combination of a cutter, a support for a comb-blank, means for reciprocating the support toward and away from the cutter, devices for intermittently feeding the comb-blank and its support longitudinally, and means independent of said feeding devices adapted to act through the comb-blank by engaging the grooves therein to cause a relative movement between the comb-blank support and the cutter in the direction of the length of the blank, substantially as described.

In testimony whereof I have signed my name to this specification in the presence of two subscribing witnesses.

FREDERICK WILLIAM GRELL.

Witnesses:
JAMES T. LAW,
EDWIN H. BROWN.